(12) United States Patent
Kogure (10) Patent No.: US 11,961,633 B2
(45) Date of Patent: Apr. 16, 2024

(54) ELECTRIC WIRE PROTECTION MEMBER AND METHOD FOR MANUFACTURING ELECTRIC WIRE PROTECTION MEMBER

(71) Applicant: YAZAKI CORPORATION, Tokyo (JP)

(72) Inventor: Naoto Kogure, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 891 days.

(21) Appl. No.: 17/005,206

(22) Filed: Aug. 27, 2020

(65) Prior Publication Data

US 2021/0065938 A1 Mar. 4, 2021

(30) Foreign Application Priority Data

Aug. 27, 2019 (JP) .................................. 2019-154566

(51) Int. Cl.
| | | |
|---|---|---|
| *H01B 13/14* | (2006.01) | |
| *H01B 3/30* | (2006.01) | |
| *H01B 7/04* | (2006.01) | |

(52) U.S. Cl.
CPC ............. *H01B 13/145* (2013.01); *H01B 7/04* (2013.01); *H01B 3/30* (2013.01)

(58) Field of Classification Search
CPC .......... H01B 13/145; H01B 7/04; H01B 3/30; B29C 48/0022; B29C 48/09; B29D 23/00; B60R 16/0215; H02G 11/006
See application file for complete search history.

(56) References Cited

U.S. PATENT DOCUMENTS

| | | |
|---|---|---|
| 2016/0185308 A1 | 6/2016 | Sekino et al. |
| 2017/0050365 A1 | 2/2017 | Richardson et al. |
| 2018/0126928 A1 | 5/2018 | Sekino et al. |

FOREIGN PATENT DOCUMENTS

| | | | |
|---|---|---|---|
| CN | 106536150 A | 3/2017 | |
| DE | 10 2017 219 745 A1 | 5/2018 | |
| JP | 2013-13183 A | 1/2013 | |
| JP | 2017-22812 A | 1/2017 | |
| JP | 2017022812 A | * 1/2017 | ............. H02G 11/00 |
| WO | 2015/168440 A1 | 11/2015 | |

* cited by examiner

*Primary Examiner* — Christopher W Raimund
(74) *Attorney, Agent, or Firm* — KENEALY VAIDYA LLP (57) ABSTRACT

An electric wire protection member covering and protecting an outer periphery of an electric wire, the electric wire protection member includes an exterior member made of a flexible resin and having a tubular body in which peak portions and valley portions are alternately formed in an axial direction over a peripheral direction orthogonal to the axial direction, and a tubular bending restriction member accommodated in the exterior member and capable of bending in one direction with one side portion as an inner side. The bending restriction member includes a cut-out portion and a plurality of divided tubular portions connected by a connecting portion formed in the one side portion. The cut-out portion is inclined in the axial direction with respect to a radial direction of the bending restriction member.

5 Claims, 8 Drawing Sheets

ELECTRIC WIRE PROTECTION MEMBER AND METHOD FOR MANUFACTURING ELECTRIC WIRE PROTECTION MEMBER

CROSS REFERENCE TO RELATED APPLICATIONS

This application claims priority from Japanese Patent Application No. 2019-154566 filed on Aug. 27, 2019, the entire contents of which are incorporated herein by reference.

BACKGROUND OF THE INVENTION

Field of the Invention

The present invention relates to an electric wire protection member and a method for manufacturing an electric wire protection member.

Description of Related Art

For example, as a guide member through which an electric wire of a wire harness routed between a vehicle body and a slide door is passed, a plurality of link bodies formed in a tubular shape are connected by a substrate that is continuous in one direction, and the substrate is bent and deformed by opening and/or closing a cut-out portion formed between adjacent link bodies (see, for example, Patent Literatures 1 and 2). According to the guide member, a bending direction of the wire harness can be restricted to one direction.
[Patent Literature 1] JP-A-2017-22812
[Patent Literature 2] JP-A-2013-13183

However, when the door is opened and/or closed and the guide member is bent and stretched, the guide member may be damaged due to contact with a surrounding structure body, or foreign matter may enter between the link bodies to cause biting, so that the guide member may not smoothly bend and/or stretch. In addition, water, sand, or the like may enter between the plurality of link bodies, which may damage the electric wire of the wire harness.

SUMMARY

One or more embodiments provide an electric wire protection member that can smoothly bend and/or stretch while favorably protecting an electric wire of a wire harness and a method for manufacturing an electric wire protection member.

In an aspect (1), an electric wire protection member covering and protecting an outer periphery of an electric wire, the electric wire protection member includes an exterior member made of a flexible resin and having a tubular body in which peak portions and valley portions are alternately formed in an axial direction over a peripheral direction orthogonal to the axial direction, and a tubular bending restriction member accommodated in the exterior member and capable of bending in one direction with one side portion as an inner side. The bending restriction member includes a cut-out portion and a plurality of divided tubular portions connected by a connecting portion formed in the one side portion. The cut-out portion is inclined in the axial direction with respect to a radial direction of the bending restriction member.

In an aspect (2), the bending restriction member may include a slit formed in another side portion over the axial direction.

According to the aspect (1), the outer periphery of the electric wire can be covered and protected, and high waterproofness and dustproofness can be secured for the electric wire. Further, a bending direction of the electric wire can be restricted in only one direction by the bending restriction member accommodated in the exterior member. In addition, since the bending restriction member for restricting the bending direction is accommodated in the exterior member, the bending restriction member together with the electric wire of the wire harness can be protected from water, sand, or the like by the exterior member, contact with a surrounding structure body can be suppressed, and a smooth bending and/or stretching operation can be maintained.

In addition, in the bending restriction member inserted and accommodated in the exterior member, the cut-out portions for forming the plurality of divided tubular portions are inclined in the axial direction with respect to the radial direction. Therefore, when the electric wire protection member is bent and/or stretched, it is possible to suppress an inward protruding portion in the valley portion of the exterior member entering between the divided tubular portions. Therefore, for example, the bending restriction member can be bent and/or stretched favorably in accordance with an opening and/or closing operation of a slide door.

According to the aspect (2), the slit is formed on the other side portion of the bending restriction member along the axial direction. Therefore, the electric wire can be easily inserted into the bending restriction member from the slit, and the bending restriction member can be mounted later.

In an aspect (3), a method for manufacturing an electric wire protection member includes molding an exterior member with a flexible resin, extrusion molding a tubular molded body, making at least one of cutting blade bite into the molded body, forming a cut-out portion, dividing the molded body into a plurality of divided tubular portions connected by a connecting portion formed in one side portion, forming a tubular bending restriction member capable of bending in one direction with one side portion as an inner side, and accommodating the tubular bending restriction member in the exterior member.

In an aspect (4), the making the at least one of cutting blade bite into the molded body includes passing the molded body between a plurality of cutters rotating in opposite directions in synchronization with each other and making a plurality of cutting blades bite into the molded body from both sides.

In an aspect (5), the making the at least one of cutting blade bite into the molded body includes making the at least one of cutting blade obliquely bite into the molded body, and forming the cut-out portion inclined in an axial direction with respect to a radial direction in the molded body.

According to the aspect (3), the tubular molded body is extrusion molded. Then, the cutting blade of the cutter is bitten into the molded body, and the cut-out portion is formed while leaving the one side portion, thereby dividing the molded body into the plurality of divided tubular portions connected by the connecting portion formed on the one side portion. As a result, it is possible to easily obtain the bending restriction member in which each of the divided tubular portions is bent at the connecting portion, and the bending direction is restricted to only one direction with the one side portion as the inner side as a whole. Further, since the molded body to be the bending restriction member is molded by the extrusion molding, manufacturing cost can be reduced as compared with a case where the molded body is formed by injection molding requiring a dedicated mold in accordance with the size and length. In addition, a portion other than the connecting portion in the divided tubular portion that restricts the bending when bent in the other direction can be easily formed to a thick wall to ensure high strength.

According to the aspect (4), it is possible to easily form the cut-out portion in the molded body formed by the extrusion molding to obtain the bending restriction member including the plurality of divided tubular portions.

According to the aspect (5), it is possible to easily form the bending restriction member in which the cut-out portions for forming the plurality of divided tubular portions are inclined in the axial direction with respect to the radial direction. In the electric wire protection member in which the bending restriction member is accommodated in the exterior member, it is possible to suppress the inward protruding portion in the valley portion of the exterior member entering between the divided tubular portions when the electric wire protection member is bent and/or stretched. Therefore, for example, the bending restriction member can be bent and/or stretched favorably accordance with the opening and/or closing operation of the slide door.

According to one or more embodiments, it is possible to provide the electric wire protection member that can smoothly bend and/or stretch while favorably protecting an electric wire of the wire harness and the method for manufacturing an electric wire protection member.

The present invention has been briefly described above. Further, details of the present invention will be clarified by reading a mode for carrying out the invention to be described below with reference to the accompanying drawings.

DETAILED DESCRIPTION

Hereinafter, an embodiment of the present invention will be described with reference to the drawings.

Figure 1:
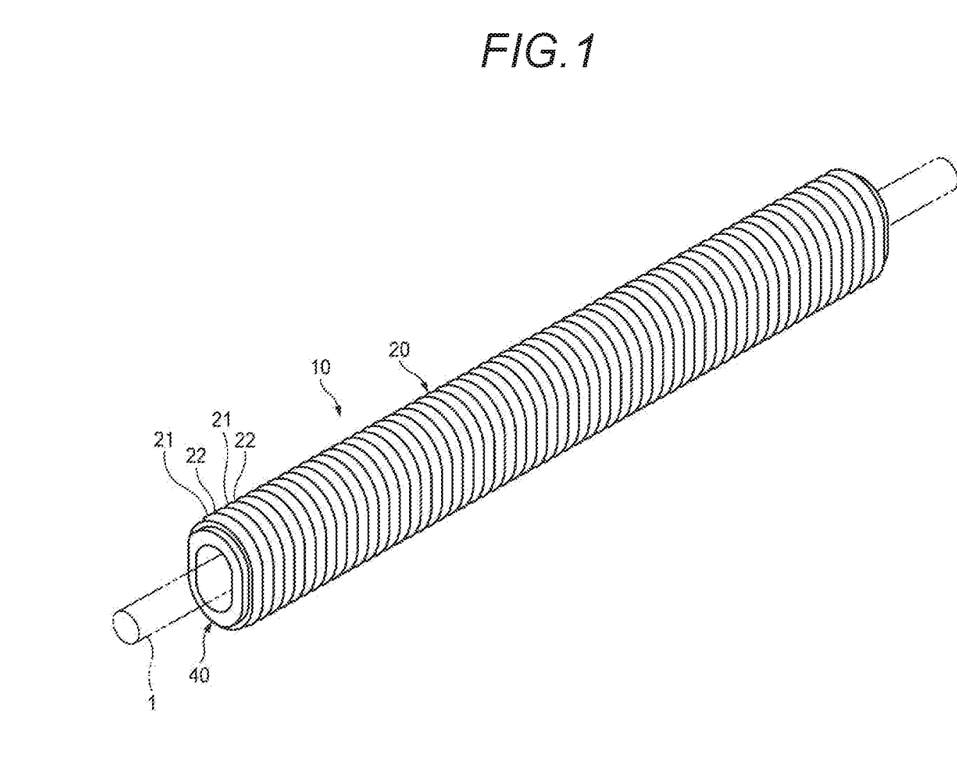
FIG. 1 is a perspective view of an electric wire protection member according to an embodiment.

FIG. 1 is a perspective view of an electric wire protection member according to the present embodiment.

As shown in FIG. 1, the electric wire protection member 10 according to the present embodiment is mounted to a wire harness 1 and protects the wire harness 1. The wire harness 1 is a bundle of electric wires formed by bundling a plurality of electric wires, and is passed through the electric wire protection member 10 having a tubular shape. As a result, an outer periphery of the wire harness 1 is covered and protected by the electric wire protection member 10. The wire harness 1 is routed between a vehicle body of a vehicle such as an automobile and a slide door that is slidable between a closed position and an open position with respect to the vehicle body. Further, the electric wire protection member 10 is mounted to a bending and/or stretching portion of the wire harness 1 that is repeatedly bent and/or stretched when the slide door is opened and/or closed.

Figure 2:
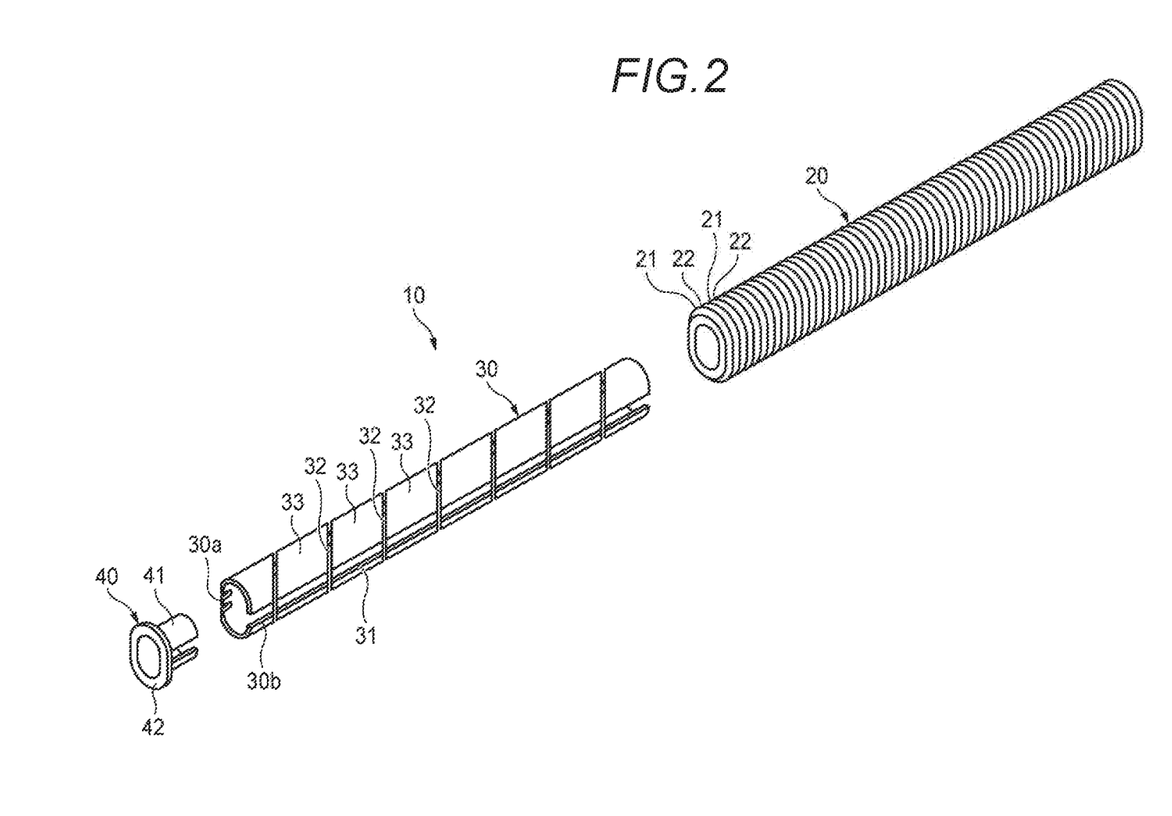
FIG. 2 is an exploded perspective view of the electric wire protection member.

FIG. 2 is an exploded perspective view of the electric wire protection member. As shown in FIG. 2, the electric wire protection member 10 includes an exterior member 20, a bending restriction member 30, and a fixing member 40.

The exterior member 20 is made of a flexible resin tubular body, and a plurality of peak portions 21 and valley portions 22 formed over a peripheral direction orthogonal to an axial direction are alternately formed in the axial direction. The exterior member 20 is a so-called corrugated tube, and is bendable in any direction.

Figure 3:
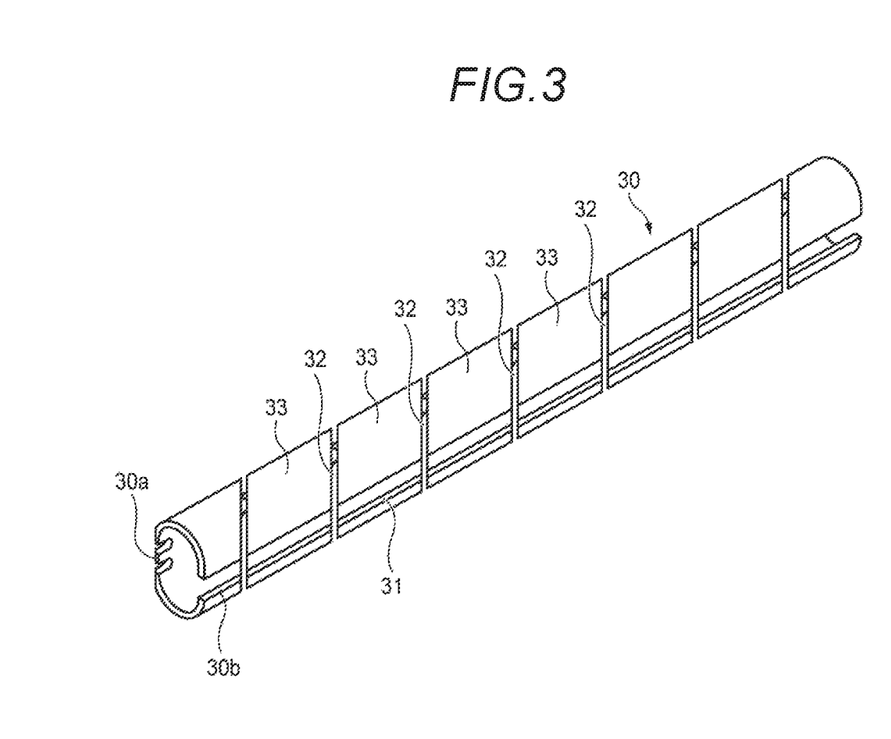
FIG. 3 is a perspective view of a bending restriction member constituting the electric wire protection member.
Figure 4A:
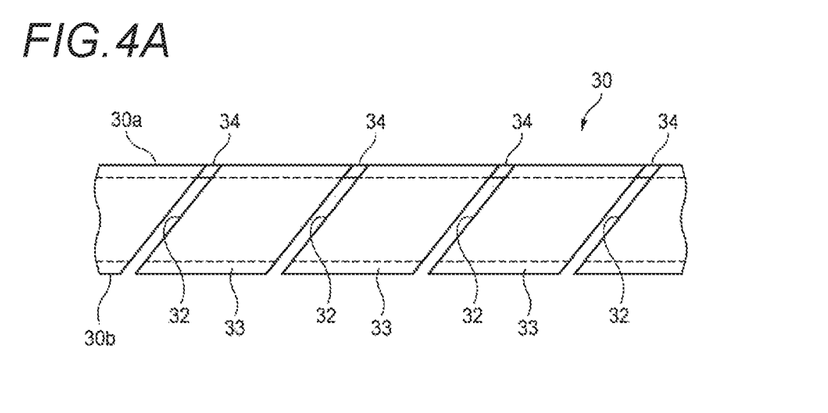
FIG. 4A is a plan view of the bending restriction member.
Figure 4B:
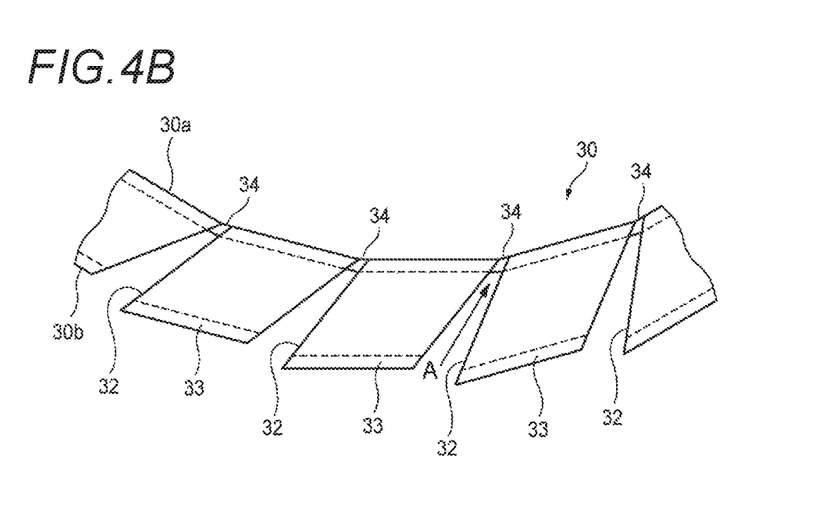
FIG. 4B is a plan view of the bending restriction member in a bent state.
Figure 5:
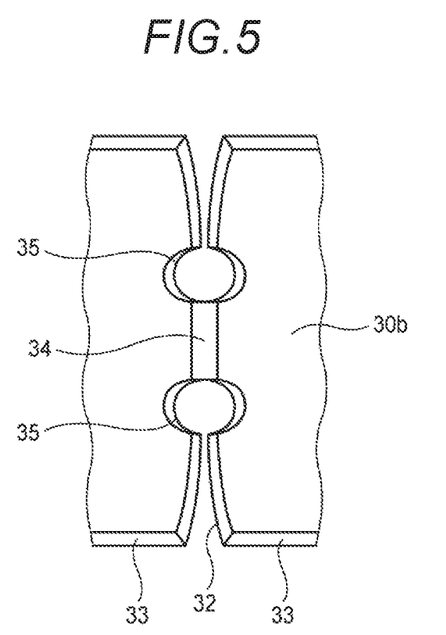
FIG. 5 is a view taken along an arrow A in FIG. 4B.

FIG. 3 is a perspective view of the bending restriction member constituting the electric wire protection member. FIG. 4A is a plan view of the bending restriction member, and FIG. 4B is a plan view of the bending restriction member in a bent state. FIG. 5 is a view taken along an arrow A in FIG. 4B.

As shown in FIGS. 3 and 4A, the bending restriction member 30 is formed in a tubular shape. The bending restriction member 30 is an extrusion molded product of synthetic resin, and is formed by a cutting machining after extrusion molding. The bending restriction member 30 includes cut-out portions 32 formed at an interval in the axial direction. The cut-out portions 32 are formed in the peripheral direction except for one side portion 30a of the bending restriction member 30, whereby the bending restriction member 30 is divided into a plurality of divided tubular portions 33 that are divided in the axial direction by the cut-out portions 32. The cut-out portions 32 that divide the bending restriction member 30 into a plurality of portions are each inclined in the axial direction with respect to a radial direction of the bending restriction member 30. In addition, the bending restriction member 30 includes a slit 31 along the axial direction on the other side portion 30b.

As shown in FIG. 5, in the bending restriction member 30, a portion on the one side portion 30a where the cut-out portion 32 is not formed is a connecting portion 34, and the adjacent divided tubular portions 33 are connected to each other by the connecting portion 34. In addition, escaping holes 35 are formed at an end portion of the cut-out portion 32, and an external force applied to the end portion of the cut-out portion 32 is dispersed at the escaping holes 35 to suppress breakage of the connecting portion 34 due to an external force being concentrated on the end portion of the connecting portion 34.

As shower in FIG. 4B, when a bending force with the one side portion 30a including the connecting portion 34 as an inner side is applied to the bending restriction member 30, the connecting portion 34 connecting the adjacent divided tubular portions 33 is bent. As a result, the other side portions 30b of the respective divided tubular portions 33 are separated from each other, and thus the entire bending restriction member 30 is bent with the one side portion 30a as the inner side.

On the other hand, when a bending force with the other side portion 30b including the slit 31 as the inner side is applied to the bending restriction member 30, end faces of the adjacent divided tubular portions 33 abut against each other. As a result, the bending restriction member 30 is restricted from bending with the other side portion 30b as the inner side. As described above, the bending restriction member 30 is allowed to bend in one direction with the one side portion 30a as the inner side, and is restricted from bending in the other direction with the other side portion 30b as the inner side.

As shown in FIG. 2, the fixing member 40 includes a fitting tubular portion 41 formed in a half-split tubular shape, and a flange portion 42 formed at one end of the fitting tubular portion 41. The fitting tubular portion 41 is fitted to an end portion of the bending restriction member 30 to lock the end portion of the bending restriction member 30. The flange portion 42 abuts against an end portion of the exterior member 20. As a result, the fixing member 40 in which the bending restriction member 30 is locked by the fitting tubular portion 41 is held at the end portion of the exterior member 20.

In order to mount the electric wire protection member 10 to the wire harness 1, the bending restriction member 30 is mounted to the wire harness 1 inserted through the exterior member 20. Specifically, the wire harness 1 is inserted from the slit 31 formed in the other side portion 30b of the bending restriction member 30, and the wire harness 1 is disposed inside each of the divided tubular portions 33 of the bending restriction member 30. Note that the wire harness 1 may be passed through the inside of the bending restriction member 30 in advance.

Next, the fitting tubular portion 41 of the fixing member 40 that has been passed through by the wire harness 1 in advance is locked to the end portion of the bending restriction member 30, and the bending restriction member 30 is moved relatively toward the exterior member 20 to be inserted into the exterior member 20. Further, the fixing member 40 locked to the end portion of the bending restriction member 30 is fixed to the exterior member 20. As a result, the electric wire protection member 10 is mounted to the wire harness 1.

As described above, the electric wire protection member 10 is mounted to the wire harness 1, so that it is possible to cover and protect the outer periphery of the wire harness 1, and to secure high waterproofness and dustproofness with respect to electric wires of the wire harness 1.

When the slide door is opened and/or closed, a bending direction of the wire harness 1 can be restricted only in one direction by the bending restriction member 30 accommodated in the exterior member 20. In addition, since the bending restriction member 30 for restricting the bending direction is accommodated in the exterior member 20, the bending restriction member 30 together with the electric wires of the wire harness 1 can be protected from water, sand, or the like by the exterior member 20, contact with a surrounding structure body can be suppressed, and a smooth bending and/or stretching operation can be maintained.

Figure 6:
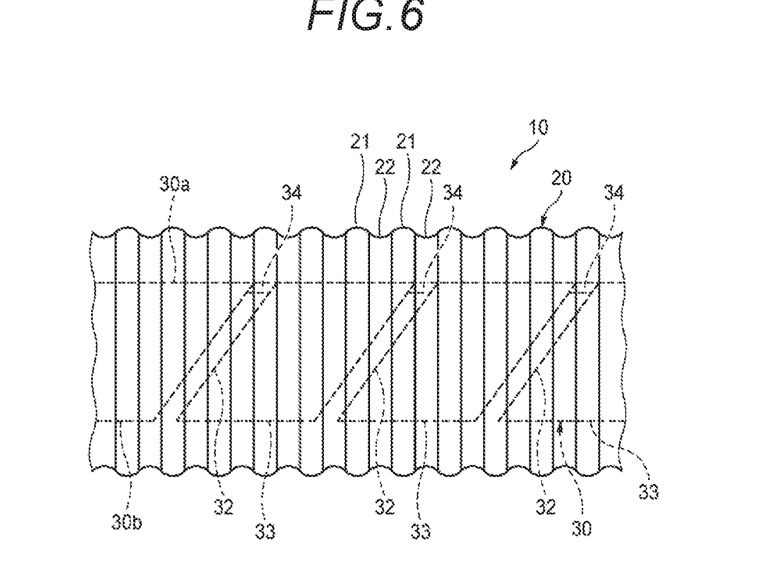
FIG. 6 is a schematic plan view of a part of the electric wire protection member showing a relationship between a valley portion of an exterior member and a cut-out portion of the bending restriction member.

FIG. 6 is a schematic plan view of a part of the electric wire protection member showing a relationship between the valley portion of the exterior member and the cut-out portion of the bending restriction member.

As shown in FIG. 6, in the exterior member 20, the plurality of peak portions 21 and valley portions 22 formed over the peripheral direction are alternately formed in the axial direction. In contrast, in the bending restriction member 30 inserted and accommodated in the exterior member 20, the cut-out portions 32 for forming the plurality of divided tubular portions 33 are inclined in the axial direction with respect to the radial direction. That is, the cut-out portion 32 intersects the valley portion 22 of the exterior member 20 on an inner periphery of the exterior member 20.

Here, a reference example will be described.

Figure 7:
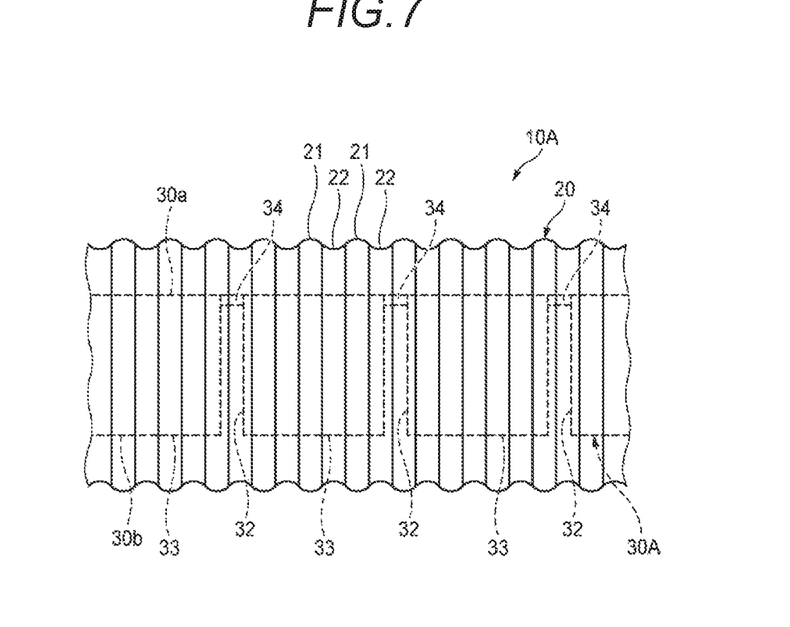
FIG. 7 is a schematic plan view of a part of an electric wire protection member showing a relationship between a valley portion of an exterior member and a cut-out portion of a bending restriction member according to a reference example.

FIG. 7 is a schematic plan view of a part of an electric wire protection member showing a relationship between a valley portion of an exterior member and a cut-out portion of a bending restriction member according to the reference example.

As shown in FIG. 7, an electric wire protection member 10A according to the reference example includes a bending restriction member 30A in which the cut-out portions 32 for forming the divided tubular portions 33 are formed in the radial direction orthogonal to the axial direction.

In this reference example, since the cut-out portion 32 of the bending restriction member 30A is formed along the same direction as the peak portion 21 and the valley portion 22 of the exterior member 20, when the electric wire protection member 10A is bent and/or stretched, the valley portion 22 protruding inward may enter between the divided tubular portions 33 on the inner periphery of the exterior member 20. As a result, the inward protruding portion of the valley portion 22 may be caught between the divided tubular portions 33, an original stretched state may not be restored, and the opening and/or closing operation of the slide door may not be smoothly followed.

On the other hand, according to the electric wire protection member 10 according to the present embodiment, in the bending restriction member 30 inserted and accommodated in the exterior member 20, the cut-out portions 32 for forming the plurality of divided tubular portions 33 are inclined in the axial direction with respect to the radial direction FIG. 6). Therefore, when the electric wire protection member 10 is bent and/or stretched, it is possible to suppress the inward protruding portion of the valley portion 22 of the exterior member 20 entering between the divided tubular portions 33 in the inner periphery of the exterior member 20. Therefore, the bending restriction member 30 can be bent and/or stretched favorably in accordance with the opening and/or closing operation of the slide door.

Next, a method for manufacturing the electric wire protection member 10 will be described.

Figure 8:
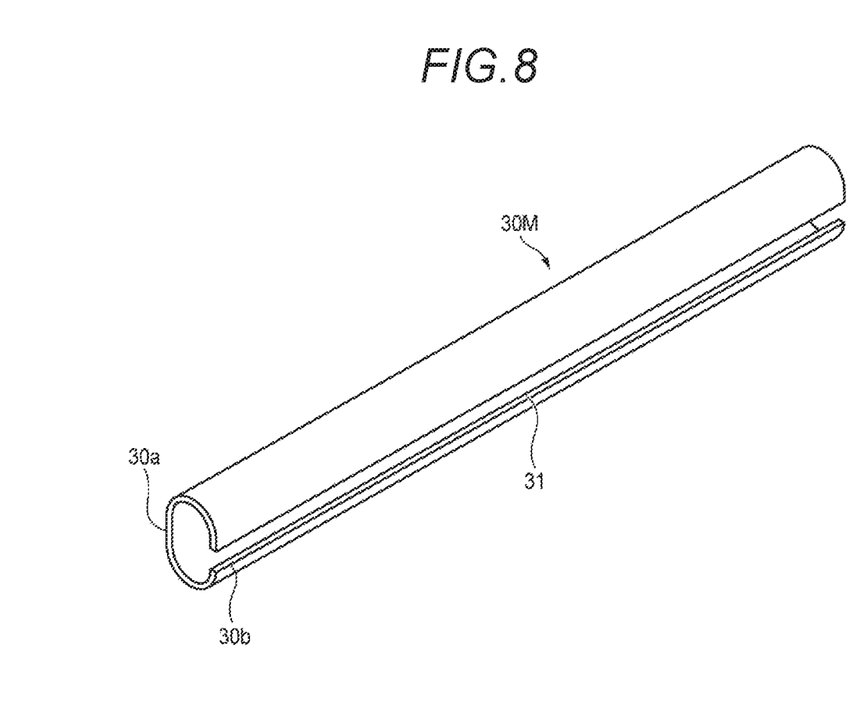
FIG. 8 is a perspective view of a molded body for explaining an extrusion molding step in a method for manufacturing an electric wire protection member.
Figure 9:
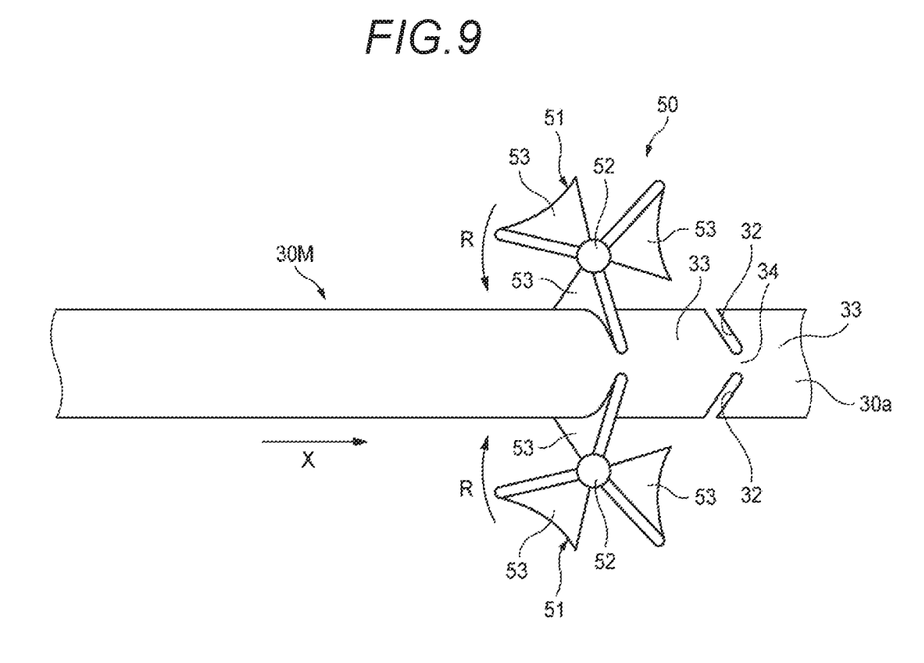
FIG. 9 is a schematic plan view of a cutting machining device for explaining a cutting step in the method for manufacturing an electric wire protection member.

FIG. 8 is a perspective view of a molded body for explaining an extrusion molding step in the method for manufacturing an electric wire protection member. FIG. 9 is a schematic plan view of a cutting machining device for explaining a cutting step in the method for manufacturing an electric wire protection member.

(Extrusion Molding Step)

First, as shown in FIG. 8, a molded body 30M to be the bending restriction member 30 is molded. The molded body 30M is formed into a tubular shape having the slit 31. The molded body 30M is molded by extrusion molding in which a molten resin is extruded from a die.

(Cutting Step)

Next, as shown in FIG. 9, the cutting machining is performed on the molded body 30M. The cutting machining for the molded body 30M is performed using a cutting machining device 50. The cutting machining device 50 includes a pair of cutters 51 disposed at intervals from each other. Each of the cutters 51 includes a rotary shaft 52 and a plurality of cutting blades 53 provided around the rotary shaft 52. These cutting blades 53 are provided obliquely with respect to the rotary shaft 52. The rotary shafts 52 of the respective cutters 51 are rotated in synchronization with each other in opposite directions (arrow R directions in FIG. 9).

In order to perform the cutting machining on the molded body 30M by the cutting machining device 50, the molded body 30M with the slit 31 facing downward is inserted between the cutters 51 of the cutting machining device 50 in a machining direction X. Then, the cutting blades 53 of the rotating cutter 51 bite into the molded body 30M obliquely from both sides. Accordingly, the molded body 30M is divided into a plurality of parts in the axial direction by forming the cut-out portions 32 in the portion where the cutting blades 53 bite. In the molded body 30M, the one side portion 30a on an opposite side to the slit 31 is the connecting portion 34, and the bending restriction member 30 including the plurality of divided tubular portions 33 connected by these connecting portions 34 is formed.

The bending restriction member 30 thus obtained is inserted into the exterior member 20, and the end portion thereof is held by the exterior member 20 by the fixing member 40. Accordingly, the electric wire protection member 10 in which the bending restriction member 30 for restricting the bending direction is accommodated in the exterior member 20 is obtained.

As described above, according to the method for manufacturing the electric wire protection member 10 according to the present embodiment, the molten resin is extruded from the die, and the tubular molded body 30M is extrusion molded. Then, the cutting blade 53 of the cutter 51 is bitten into the molded body 30M, and the cut-out portion 32 is formed while leaving the one side portion 30a, thereby dividing the molded body 30M into the plurality of divided tubular portions 33 connected by the connecting portion 34 formed on the one side portion 30a. As a result, it is possible to easily obtain the bending restriction member 30 in which each of the divided tubular portions 33 is bent at the connecting portion 34, and the bending direction is restricted to only one direction with the one side portion 30a as the inner side as a whole. Further, since the molded body 30M to be the bending restriction member 30 is molded by the extrusion molding, manufacturing cost can be reduced as compared with a case where the molded body 30M is formed by injection molding requiring a dedicated mold in accordance with the size and length. In addition, a portion other than the connecting portion 34 in the divided tubular portion 33 that restricts the bending when bent in the other direction can be easily formed to a thick wall to ensure high strength.

Since the cutting blades 53 are obliquely bitten into the molded body 30M and the cut-out portions 32 inclined in the axial direction with respect to the radial direction are formed in the molded body 30M, it is possible to easily form the bending restriction member 30 in which the cut-out portions 32 for forming the plurality of divided tubular portions 33 are inclined in the axial direction with respect to the radial direction.

In the electric wire protection member 10 in which the bending restriction member 30 is accommodated in the exterior member 20, it is possible to suppress the inward protruding portion in the valley portion 22 of the exterior member 20 entering between the divided tubular portions 33 when the electric wire protection member 10 is bent and/or stretched. Therefore, for example, the bending restriction member can be bent and/or stretched favorably in accordance with the opening and/or closing operation of the slide door.

The present invention is not limited to the embodiment described above, and modifications, improvements, or the like can be made as appropriate. In addition, materials, shapes, sizes, numbers, arrangement places or the like of constituent elements in the above embodiment are optional and not limited as long as the object of the present invention can be achieved.

Here, characteristics of embodiment of the electric wire protection member and the method for manufacturing an electric wire protection member according to the present invention described above will be briefly summarized in the following [1] to [5], respectively.

[1] An electric wire protection member (10) covering and protecting an outer periphery of an electric wire, the electric wire protection member comprising:
an exterior member (20) made of a flexible resin and having a tubular body in which peak portions (21) and valley portions (22) are alternately formed in an axial direction over a peripheral direction orthogonal to the axial direction; and
a tubular bending restriction member (30) accommodated in the exterior member (20) and capable of bending in one direction with one side portion (30a) as an inner side,
wherein the bending restriction member (30) includes a cut-out portion (32) and a plurality of divided tubular portions (33) connected by a connecting portion (34) formed in the one side portion (30a), and
wherein the cut-out portion (32) is inclined in the axial direction with respect to a radial direction of the bending restriction member (30).

[2] The electric wire protection member according to [1], wherein the bending restriction member (30) includes a slit (31) formed in another side portion (30b) over the axial direction.

[3] A method for manufacturing an electric wire protection member (10) comprising,
molding an exterior member (20) with a flexible resin;
extrusion molding a tubular molded body (30M);
making at least one of cutting blade (53) bite into the molded body (30M), forming a cut-out portion (32), dividing the molded body (30M) into a plurality of divided tubular portions (33) connected by a connecting portion (34) formed in one side portion (30a), forming a tubular bending restriction member (30) capable of bending in one direction with one side portion (30a) as an inner side; and
accommodating the tubular bending restriction member (30) in the exterior member (20).

[4] The method for manufacturing an electric wire protection member according to [3],
wherein the making the at least one of cutting blade (53) bite into the molded body (30M) includes passing the molded body (30M) between a plurality of cutters (51) rotating in opposite directions in synchronization with each other and making a plurality of cutting blades (53) bite into the molded body (30M) from both sides.

[5] The method for manufacturing an electric wire protection member according to [3] or [4],
wherein the making the at least one of cutting blade (53) bite into the molded body (30M) includes making the at least one of cutting blade (53) obliquely bite into the molded body (30M), and forming the cut-out portion (32) inclined in an axial direction with respect to a radial direction in the molded body (30M).

DESCRIPTION OF REFERENCE NUMERALS AND SIGNS 1 wire harness (electric wire)
10 electric wire protection member
20 exterior member
21 peak portion
22 valley portion
30 bending restriction member
30a one side portion
30h other side portion
31 slit
32 cut-out portion
33 divided tubular portion
34 connecting portion
51 cutter
53 cutting blade

What is claimed is:

1. An electric wire protection member covering and protecting an outer periphery of an electric wire, the electric wire protection member comprising:
   an exterior member having a tubular body made of a flexible resin and in which peak portions and valley portions are alternately formed in an axial direction over a peripheral direction orthogonal to the axial direction; and
   a tubular bending restriction member accommodated in the exterior member and capable of bending in one direction with one side portion as an inner side,
   wherein the bending restriction member includes a cut-out portion and a plurality of divided tubular portions connected by a connecting portion formed in the one side portion, and
   wherein the cut-out portion is inclined in the axial direction with respect to a radial direction of the bending restriction member,
   wherein a first one of the divided tubular portions includes a first end face and a second one of the divided tubular portions includes a second end face,
   wherein the cut-out portion extends between and along the first end face and the second end face, and
   wherein the first end face is parallel to the second end face when the first one of the divided tubular portions and the second one of the divided tubular portions together extend in straight line.

2. A method for manufacturing the electric wire protection member according to claim 1, the method comprising,
   molding the exterior member with a flexible resin;
   extrusion molding a tubular molded body;
   making at least one of cutting blade bite into the molded body, forming a cut-out portion, dividing the molded body into a plurality of divided tubular portions connected by a connecting portion formed in one side portion, forming the tubular bending restriction member capable of bending in one direction with one side portion as an inner side; and
   accommodating the tubular bending restriction member in the exterior member.

3. The method for manufacturing an electric wire protection member according to claim 2,
   wherein the making the at least one of cutting blade bite into the molded body includes passing the molded body between a plurality of cutters rotating in opposite directions in synchronization with each other and making a plurality of cutting blades bite into the molded body from both sides.

4. The method for manufacturing an electric wire protection member according to claim 2,
   wherein the making the at least one of cutting blade bite into the molded body includes making the at least one of cutting blade obliquely bite into the molded body, and forming the cut-out portion inclined in an axial direction with respect to a radial direction in the molded body.

5. An electric wire protection member covering and protecting an outer periphery of an electric wire, the electric wire protection member comprising:
   an exterior member having a tubular body made of a flexible resin and in which peak portions and valley portions are alternately formed in an axial direction over a peripheral direction orthogonal to the axial direction; and
   a tubular bending restriction member accommodated in the exterior member and capable of bending in one direction with one side portion as an inner side,
   wherein the bending restriction member includes a cut-out portion and a plurality of divided tubular portions connected by a connecting portion formed in the one side portion,
   wherein the cut-out portion is inclined in the axial direction with respect to a radial direction of the bending restriction member, and
   wherein the bending restriction member includes a slit formed in another side portion, and the slit extends across each of a first one of the divided tubular portions and a second one of the divided tubular portions in the axial direction.

* * * * *